US012459272B2

(12) United States Patent
Karasawa et al.

(10) Patent No.: US 12,459,272 B2
(45) Date of Patent: Nov. 4, 2025

(54) LIQUID CONTAINER

(71) Applicant: SEIKO EPSON CORPORATION, Tokyo (JP)

(72) Inventors: Masahiro Karasawa, Matsumoto (JP); Kazuyuki Hirata, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 197 days.

(21) Appl. No.: 18/217,881

(22) Filed: Jul. 3, 2023

(65) Prior Publication Data

US 2024/0001686 A1 Jan. 4, 2024

(30) Foreign Application Priority Data

Jul. 4, 2022 (JP) ................................ 2022-107640

(51) Int. Cl.
*B41J 2/19* (2006.01)
*B41J 2/175* (2006.01)

(52) U.S. Cl.
CPC ............. *B41J 2/19* (2013.01); *B41J 2/17513* (2013.01); *B41J 2/17523* (2013.01); *B41J 2002/17516* (2013.01)

(58) Field of Classification Search
CPC ...... B41J 2/19; B41J 2/17513; B41J 2/17523; B41J 2002/17516; B41J 2/175
USPC ........................................................... 347/86
See application file for complete search history.

(56) References Cited

U.S. PATENT DOCUMENTS 11,052,667 B2 7/2021 Karasawa et al.
2020/0164655 A1* 5/2020 Karasawa ............ B41J 2/17523
2021/0268802 A1* 9/2021 Ikegame ............. B41J 2/17553

FOREIGN PATENT DOCUMENTS

JP 2020-082532 A 6/2020

* cited by examiner

*Primary Examiner* — Jason S Uhlenhake
*Assistant Examiner* — Alexander D Shenderov
(74) *Attorney, Agent, or Firm* — Oliff PLC

(57) ABSTRACT

A liquid container includes: a bag having flexibility configured to store liquid inside; a liquid outlet member mounted on one end of the bag and having a liquid outlet section to discharge the liquid to a liquid ejecting apparatus; a gas absorption unit movably disposed in the bag and having (i) a space holding member that forms an internal space of the gas absorption unit, and (ii) a gas transmission film that defines an inside of the internal space and an outside with the internal space decompressed to a pressure lower than an atmospheric pressure; and a plurality of liquid outlet pipes coupled to the liquid outlet section and disposed in the bag, the plurality of liquid outlet pipes having an inlet, which are configured to allow the liquid introduced from the inlet to flow to the liquid outlet section. Lengths of the plurality of liquid outlet pipes are different.

9 Claims, 8 Drawing Sheets

LIQUID CONTAINER

The present application is based on, and claims priority from JP Application Serial Number 2022-107640, filed Jul. 4, 2022, the disclosure of which is hereby incorporated by reference herein in its entirety.

BACKGROUND

1. Technical Field

The present disclosure relates to a liquid container.

2. Related Art

A liquid container having a gas absorber inside is known (for example, JP-A-2020-82532). The gas absorber described in JP-A-2020-82532 is provided separately from a supply port for supplying liquid to the outside.

As described above, when the gas absorber is provided separately from the supply port, the gas absorber freely moves within the liquid container. When the liquid in the liquid container is consumed with the gas absorber at a position away from the supply port, an occluded area may occur in the liquid container, and the liquid around the gas absorber may not be consumed and left.

SUMMARY

According to an aspect of the present disclosure, a liquid container is provided. The liquid container includes: a bag having flexibility configured to store liquid inside; a liquid outlet member mounted on one end of the bag and having a liquid outlet section to discharge the liquid to a liquid ejecting apparatus; a gas absorption unit movably disposed in the bag and having (i) a space holding member that forms an internal space of the gas absorption unit, and (ii) a gas transmission film that defines an inside of the internal space and an outside with the internal space decompressed to a pressure lower than an atmospheric pressure; and a plurality of liquid outlet pipes coupled to the liquid outlet section and disposed in the bag, the plurality of liquid outlet pipes having an inlet, which are configured to allow the liquid introduced from the inlet to flow to the liquid outlet section. Lengths of the plurality of liquid outlet pipes are different.

DESCRIPTION OF EXEMPLARY EMBODIMENTS

A. First Embodiment

A1. Configuration of Liquid Ejecting Apparatus

Figure 1:
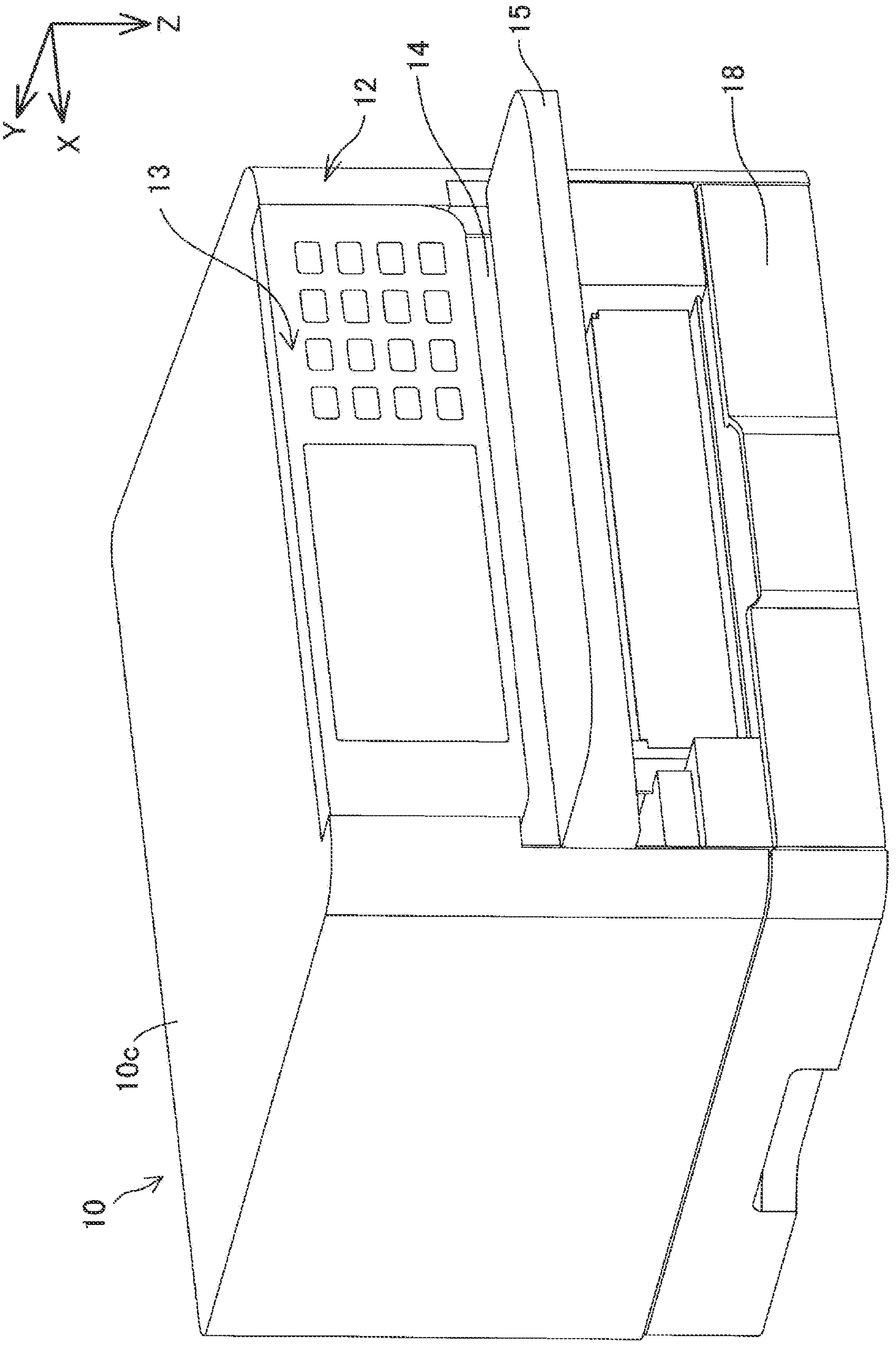
FIG. 1 is a perspective view of a liquid ejecting apparatus.

FIG. 1 is a perspective view of a liquid ejecting apparatus 10 in this embodiment. In FIG. 1, arrows X, Y, Z are illustrated, which indicate three directions perpendicular to each other. Note that the arrows X, Y, Z in the drawings other than FIG. 1 are appropriately illustrated corresponding to those in FIG. 1.

The directions indicated by the arrows X, Y, Z correspond to the arrangement posture of the liquid ejecting apparatus 10 in a normal use state. The normal use state of the liquid ejecting apparatus 10 is the state when the liquid ejecting apparatus 10 is disposed on a horizontal plane and used. Hereinafter, the directions indicated by the arrows X, Y, Z are called "X direction", "Y direction", and "Z direction", respectively. The Z direction is a vertical direction. For the X direction, one direction thereof is called "+X direction", and the other direction is called "−X direction". Similarly, for the Y, Z directions, one directions are called "+Y direction" and "+Z direction", and the other directions are called "−Y direction" and "−Z direction". In the following description, −Y direction is also called "front direction", and +Y direction is also called "rear direction". −X direction is also called "right direction", and +X direction is also called "left direction". −Z direction is also called "upper direction", and +Z direction is also called "lower direction".

The liquid ejecting apparatus 10 is an ink jet printer. The liquid consumed by ejection of the liquid ejecting apparatus 10 is ink. In this embodiment, the ink contains dye having an azo group. The liquid ejecting apparatus 10 discharges ink drops to form a printed image on a medium MP. The medium MP is, for example, fabric paper and a print sheet. The liquid ejecting apparatus 10 in this embodiment includes a housing 10*c* that is a hollow resin box body constituting the exterior of the liquid ejecting apparatus 10. The housing 10*c* has an approximately cuboid shape. A front surface 12 of the housing 10*c* is provided with an operation section 13, a medium discharge port 14, a medium receiving section 15, and a cover member 18.

The operation section 13 has a display that displays information to a user, and a plurality of operation buttons that receive an operation of a user. The medium discharge port 14 is an outlet for the medium MP delivered from the inside of the liquid ejecting apparatus 10. The medium discharge port 14 is a slit-shaped opening having a large width in the X direction. The medium receiving section 15 projects in an eaves shape in −Y direction below the medium discharge port 14, and receives the medium MP discharged through the medium discharge port 14.

The cover member 18 is a plate-like resin member that constitutes part of the exterior of the liquid ejecting apparatus 10. The cover member 18 is detachably attached to the housing 10*c*. The cover member 18 covers and protects mounting bodies 105 illustrated in FIG. 2, which are stored inside the liquid ejecting apparatus 10.

Figure 2:
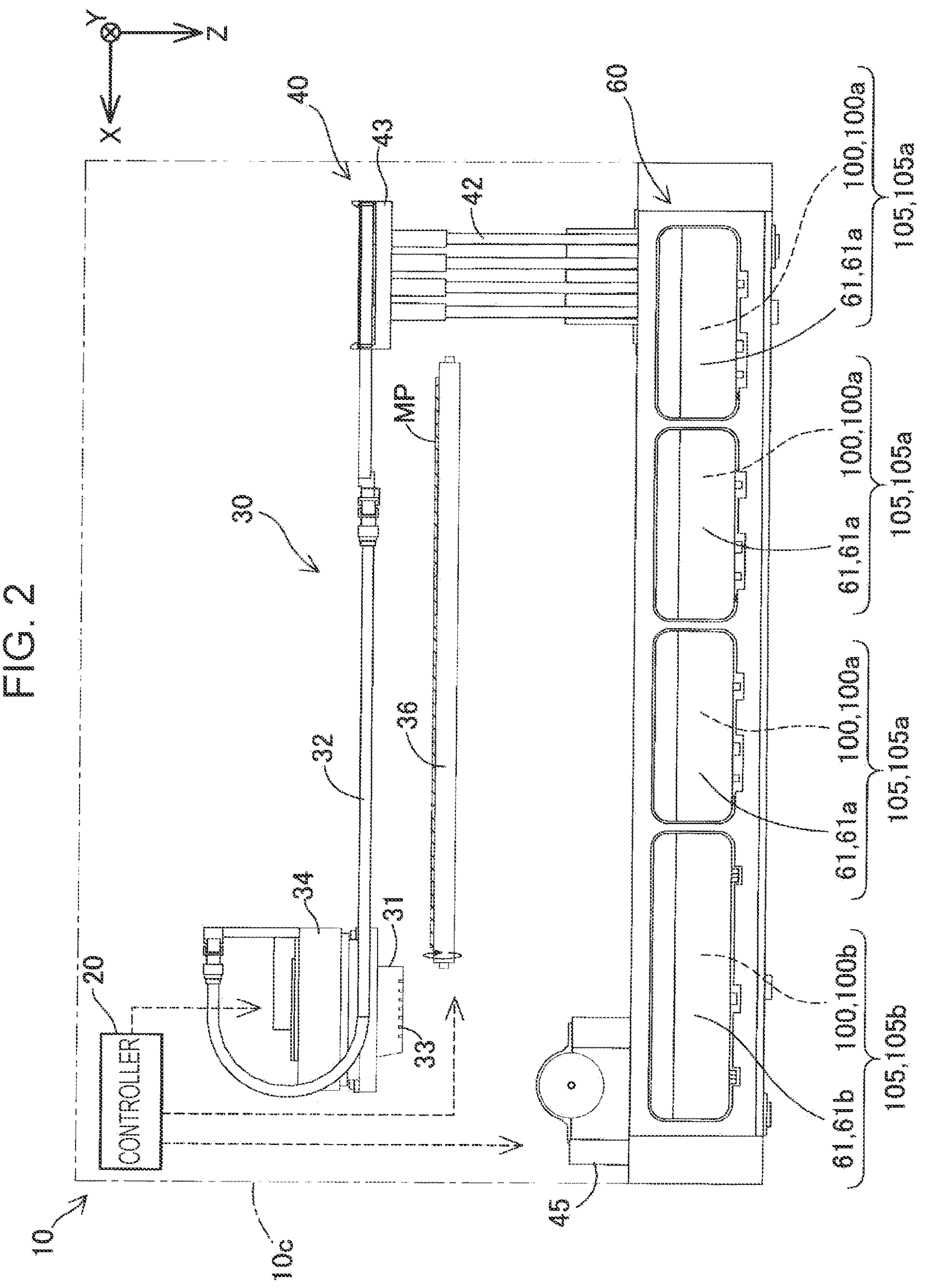
FIG. 2 is a schematic configuration view of the liquid ejecting apparatus as seen from the front.

FIG. 2 is a schematic configuration view of the liquid ejecting apparatus 10 as seen from the front. As illustrated in FIG. 2, the liquid ejecting apparatus 10 includes a controller 20, a discharge executor 30, a transport roller 36, a liquid feeder 40, and a case storage 60.

The case storage 60 is disposed inside the cover member 18 illustrated in FIG. 1 at the bottom of the liquid ejecting apparatus 10. Four mounting bodies 105 are stored in the case storage 60. Specifically, the four mounting bodies 105 include three first mounting bodies 105*a*, and one second mounting body 105*b*. The first mounting bodies 105*a* and the second mounting body 105*b* are different from each other in size. The second mounting body 105*b* is larger than the first mounting bodies 105*a*. The mounting bodies 105 are each comprised of a case 61, and a liquid container 100 stored in the case 61. As in the mounting bodies 105, four cases 61 include three first cases 61*a*, and one second case 61*b*. Four liquid containers 100 include three first liquid containers 100*a*, and one second liquid container 100*b*. The first mounting bodies 105*a* are formed such that the first liquid containers 100*a* are stored in respective first cases 61*a*. The second mounting body 105*b* is formed such that the second liquid container 100*b* is stored in the second case 61*b*. The second liquid container 100*b* is larger than the first liquid containers 100*a*. For example, cyan, magenta, and yellow inks are stored in the respective three first liquid containers 100*a*, and black ink is stored in the second liquid container 100*b*.

The discharge executor 30 includes a liquid discharger 31, a plurality of tubes 32, and a carriage 34. The bottom surface of the liquid discharger 31 is provided with nozzles 33 which are open downward. The liquid discharger 31 discharges liquid through the nozzles 33 through application of pressure to the ink caused by piezoelectric elements, for example. The liquid discharger 31 is mounted on the carriage 34. The carriage 34 linearly moves back and forth in the X direction. The transport roller 36 is installed in the X direction below the liquid discharger 31. The transport roller 36 transports the medium MP. The plurality of tubes 32 are arranged in the Y direction, and coupled to the liquid discharger 31.

The liquid feeder 40 has four feed pipes 42, a joint 43, and a sucker 45. The four feed pipes 42 are coupled to respective four liquid containers 100. The joint 43 is coupled to each of the four feed pipes 42, and each of the plurality of tubes 32. The ink stored in the liquid container 100 is fed to the liquid discharger 31 through the four feed pipes 42, the joint 43, and the plurality of tubes 32. The sucker 45 generates a pressure to deliver the ink from the liquid containers 100 to the feed pipes 42.

The controller 20 controls the driving of each component of the liquid ejecting apparatus 10. The controller 20 is comprised of a microcomputer including at least a central processing unit and a main memory, and implements various types of functions by the central processing unit reading various types of programs into the main memory and executing them.

Figure 3:
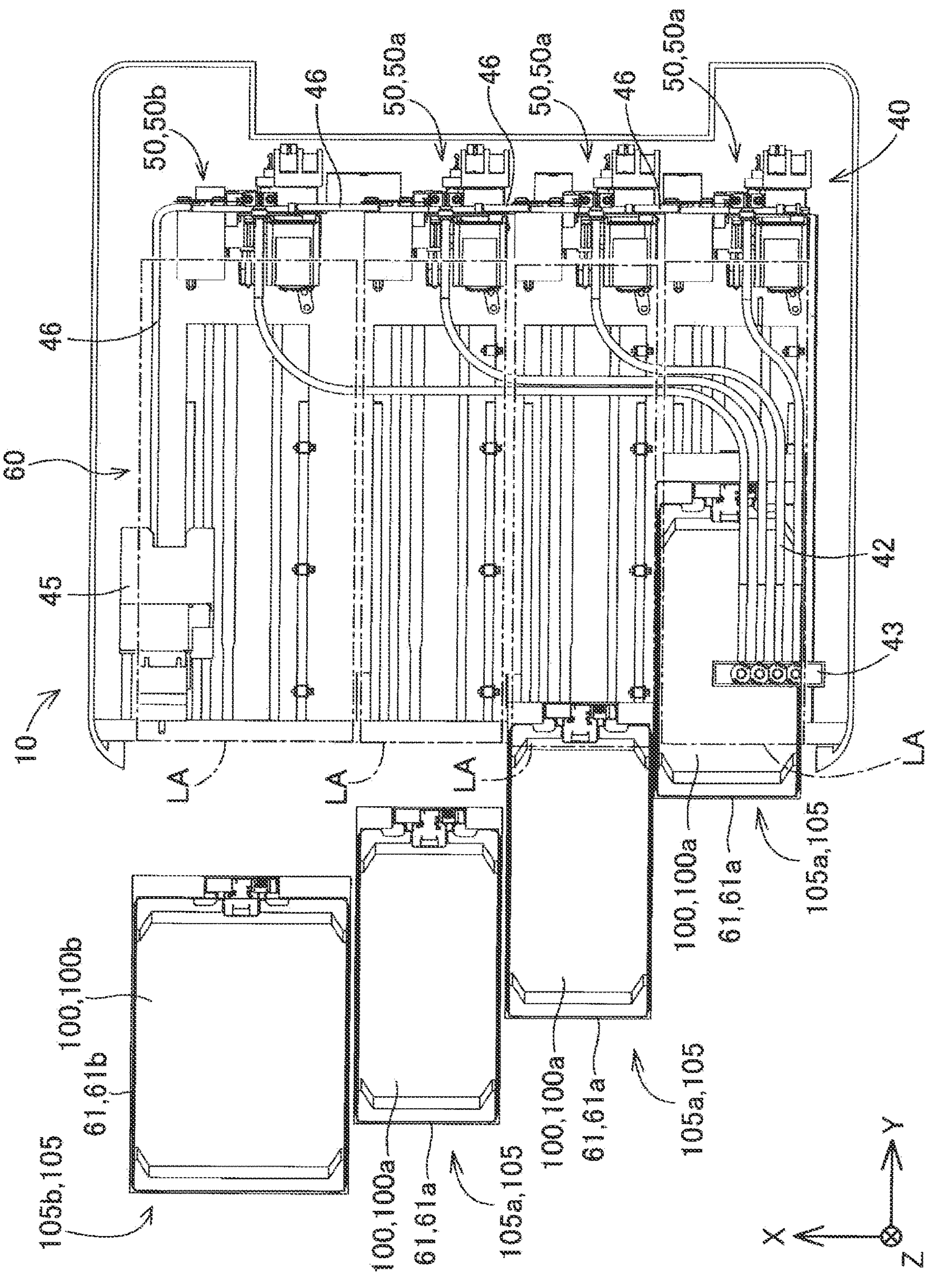
FIG. 3 is a schematic plan view of a liquid feeder as seen from above.
Figure 4:
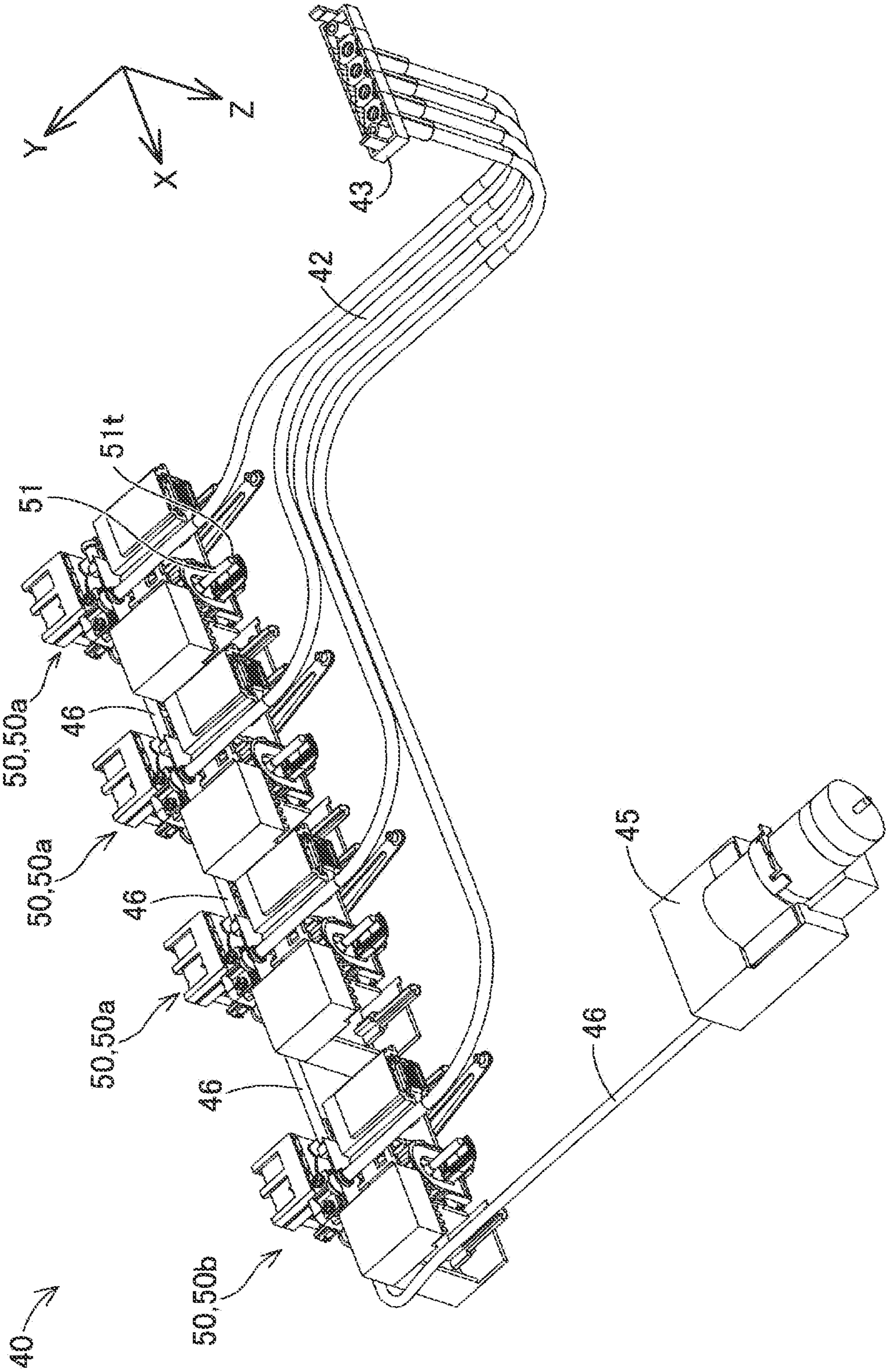
FIG. 4 is a schematic perspective view of the liquid feeder.

FIG. 3 is a schematic plan view of the liquid feeder 40 as seen from above. FIG. 4 is a schematic perspective view of the liquid feeder 40. As illustrated in FIG. 3, the mounting bodies 105 are inserted into the case storage 60 in +Y direction from the outside. The four mounting bodies 105 are arranged in the X direction and stored in the case storage 60. FIG. 3 illustrates, by a dashed-dotted line, arrangement areas LA which are the arrangement positions of the mounting bodies 105 in the case storage 60.

In addition to the above-described components, the liquid feeder 40 has four switching mechanisms 50, and a pressure transmission pipe 46. The four switching mechanisms 50 are disposed on +Y direction side of the arrangement areas LA. The four switching mechanisms 50 are disposed corresponding to respective arrangement areas LA. Specifically, the four switching mechanisms 50 include three first switching mechanisms 50*a*, and one second switching mechanism 50*b*. The three first switching mechanisms 50*a* correspond to respective three first liquid containers 100*a*. The second switching mechanism 50*b* corresponds to the second liquid container 100*b*.

As illustrated in FIG. 4, each switching mechanism 50 has a corresponding feeding needle 51. The feeding needle 51 is detachably attached to a corresponding liquid container 100. The feeding needle 51 has a tubular shape linearly extending in −Y direction. The feeding needle 51 is coupled to a corresponding liquid container 100 by inserting an end 51*t* into the liquid container 100. The ink stored in the liquid container 100 flows through the inside of the feeding needle 51. The pressure transmission pipe 46 transmits the pressure generated by the sucker 45.

A2. Configuration of Liquid Container

Figure 5:
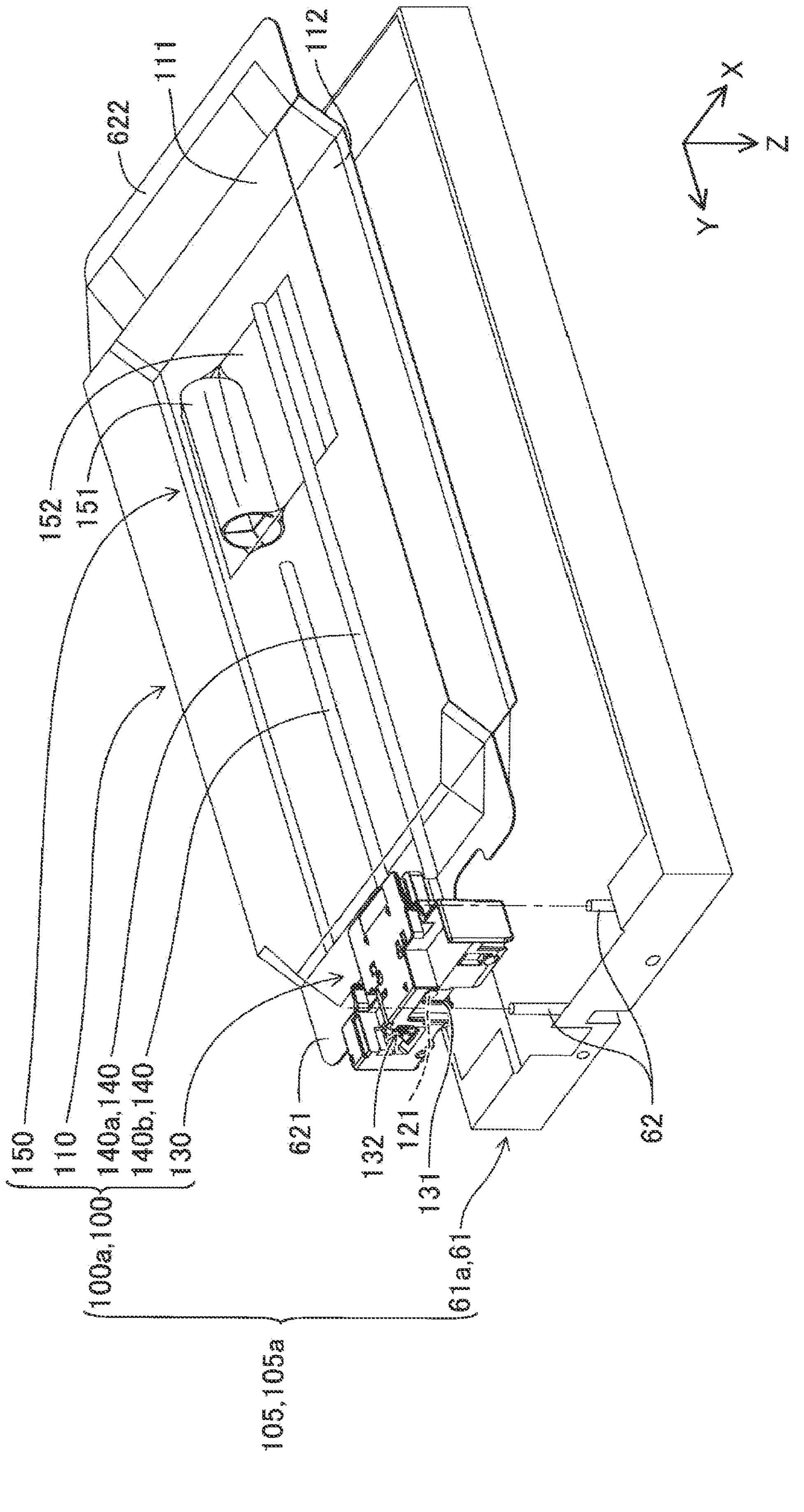
FIG. 5 is a schematic exploded perspective view with a liquid container detached from a case.
Figure 6:
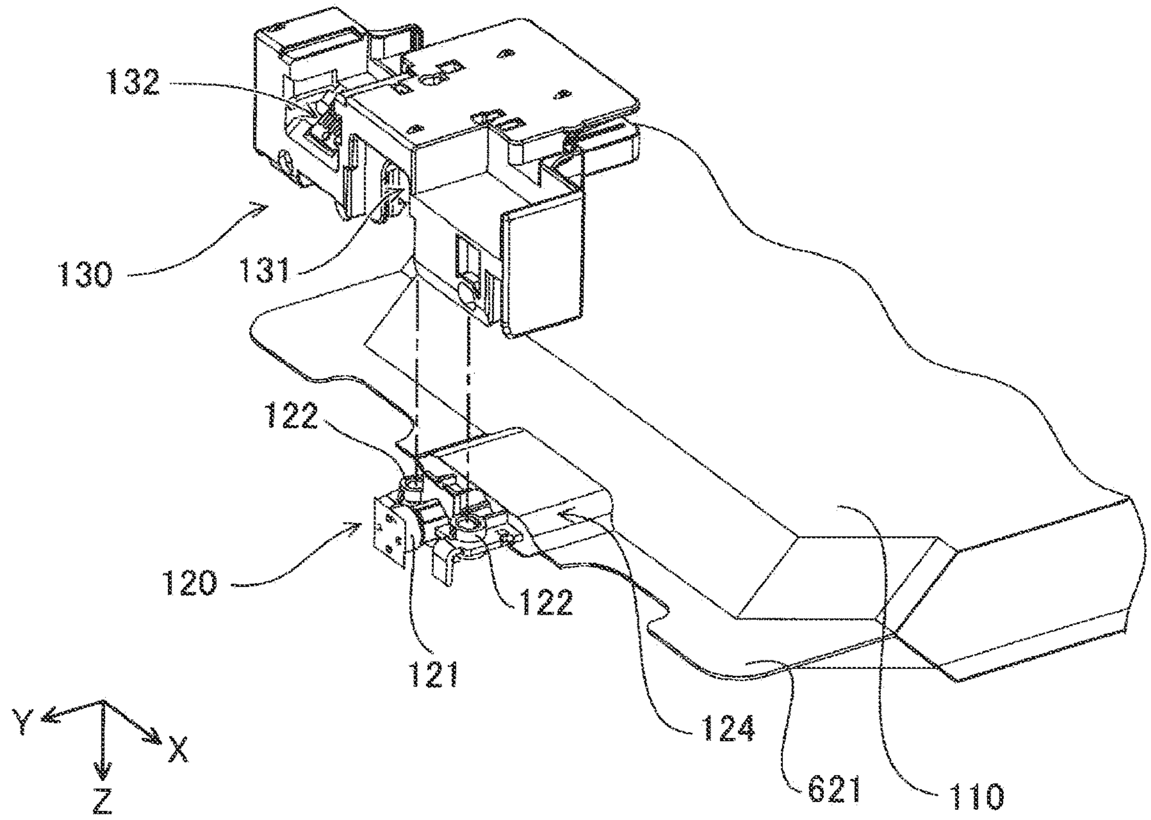
FIG. 6 is a schematic exploded perspective view with an adapter detached from a liquid outlet member.

FIG. 5 is a schematic exploded perspective view with the first liquid containers 100*a* detached from the respective first cases 61*a*. FIG. 6 is a schematic exploded perspective view with an adapter detached from a liquid outlet member. The second mounting body 105*b* has the same configuration as that of each first mounting body 105*a*. Thus, in the following, the first mounting body 105*a* will be representatively described, and a description of the second mounting body 105*b* is omitted.

Each case 61 is a tray-shaped container with an upper side opened. The case 61 is produced with, for example, a resin member such as polypropylene. In the case 61, a corresponding liquid container 100 is detachably stored from above. The end of the case 61 in +Y direction is provided with two cylindrical guide sections 62 which stand up from the lower surface of the case 61. When a liquid container 100 is stored in the case 61, the two cylindrical guide sections 62 guide the later-described adapter 130.

The liquid container 100 includes a bag 110, an adapter 130, a plurality of liquid outlet pipes 140, and a gas absorption unit 150 which are illustrated in FIG. 5, and a liquid outlet member 120 illustrated in FIG. 6. The plurality of liquid outlet pipes 140 are coupled to the later-described liquid outlet section 121, and disposed in the bag 110. The plurality of liquid outlet pipes 140 include a first liquid outlet pipe 140*a*, and a second liquid outlet pipe 140*b*. The bag 110 stores ink as liquid in an internal liquid storage space. The bag 110 has a long and flat external shape from one end 621 to the other end 622 in −Y direction. The bag 110 has a bag shape, and is formed by joining a plurality of films having flexibility together. Specifically, the bag 110 is formed by overlapping a plurality of films, joining parts of peripheral sections, and the other part of peripheral section and the adapter 130 by a method such as thermal welding. In this embodiment, the bag 110 is a so-called gusset bag which is formed by the later-described first surface film 111 and second surface film 112, and two pieces of films which serve as gussets disposed at both ends of the bag 110 in the X direction. Note that the bag 110 is not limited to a gusset type, and may be a so-called pillow bag that is formed by two pieces of films. The films constituting the bag 110 is composed of a material having flexibility and a gas barrier property. For example, as the material for the film, polyethylene terephthalate (PET), nylon, and polyethylene may be mentioned. Alternatively, a film may be formed using a layered structure in which multiple films composed of these materials are layered. In such a layered structure, for example, the outer layer may be composed of PET or nylon superior in impact resistance, and the inner layer may be composed of polyethylene superior in ink-resistance property. Furthermore, a film having a layer deposited with aluminum may be one constituent member of the layered structure.

The bag 110 has the first surface 111 forming the upper surface, and the second surface 112 opposed to the first surface 111 and forming the bottom surface. The first surface 111 and the second surface 112 are each formed by one piece of film. As described above, a liquid storage space is formed by sealing the periphery of the first surface 111 and the second surface 112 which are overlapped. The bag 110 has one end 621, and the other end 622 opposed to the one end 621. The one end 621 is the +Y direction-side end. The other end 622 is the −Y direction-side end. As the ink in the bag 110 is consumed, the bag 110 is deformed so that the first surface 111 and the second surface 112 approach each other.

The gas absorption unit 150 is movably disposed in the bag 110. As described in detail later, the gas absorption unit 150 absorbs the gas molecules dissolved in the ink in the bag 110.

The adapter 130 is located at the one end 621 of the bag 110. The adapter 130 is detachably attached to the liquid outlet member 120 welded to the bag 110. The adapter 130 is coupled to the switching mechanisms 50 of the liquid ejecting apparatus 10 in an attached state in which the liquid containers 100 are attached to the liquid ejecting apparatus 10. The adapter 130 has a through-hole 131 which is open in +Y direction. The through-hole 131 is a hole penetrating in the Y direction for inserting the liquid outlet section 121 therethrough. The adapter 130 has a coupling terminal 132. The coupling terminal 132 is provided on the surface of a circuit board, for example. The circuit board includes a memory that stores various types of information on the liquid container 100. The information on the liquid container 100 includes information indicating the type of the liquid container 100, and the amount of stored liquid, for example.

Figure 7:
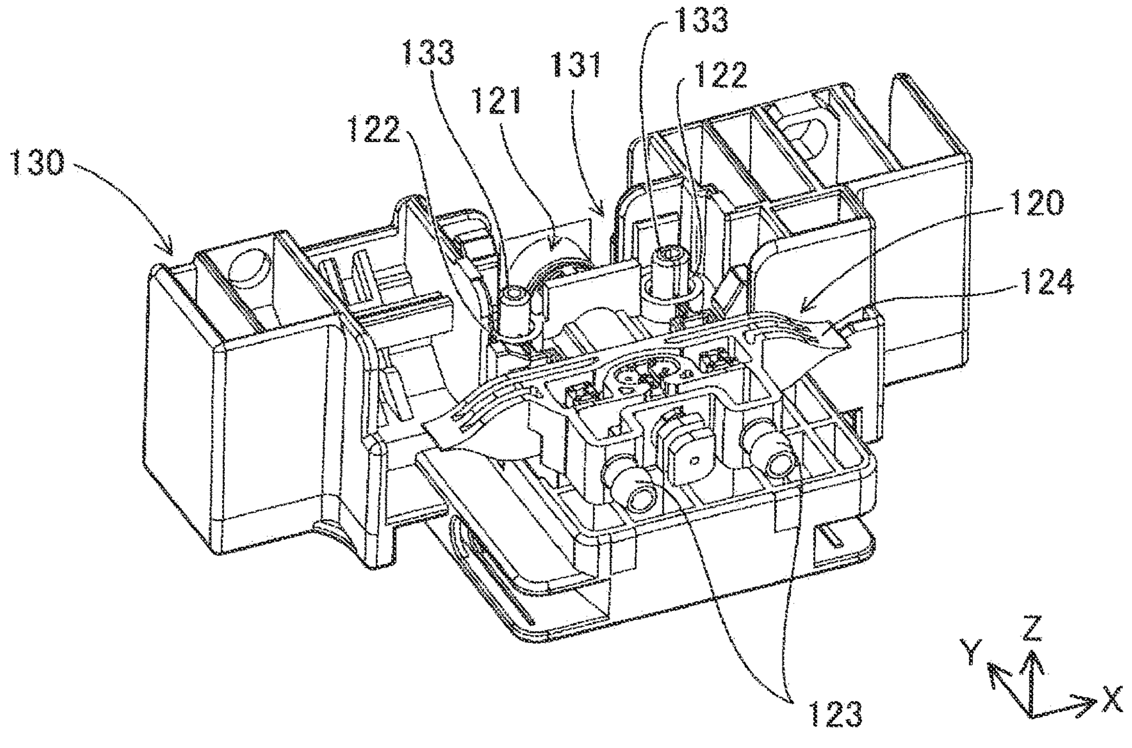
FIG. 7 is a perspective view of the liquid outlet member with an adapter attached.
Figure 8:
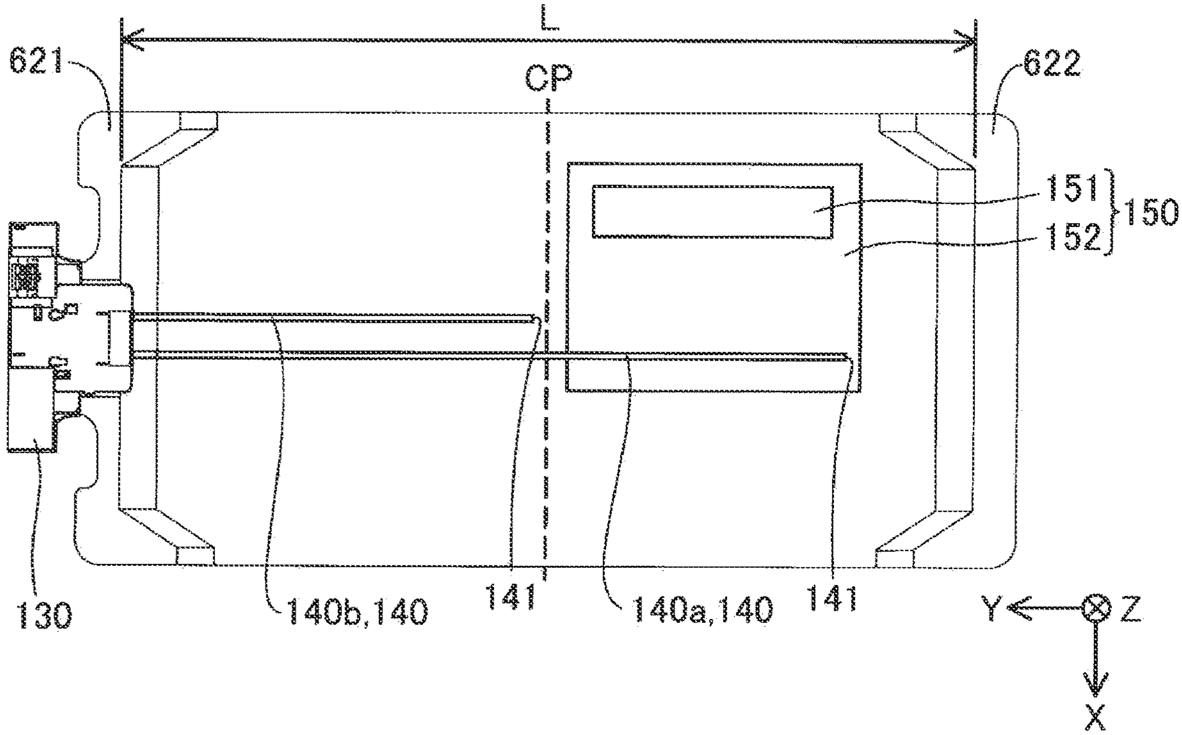
FIG. 8 is a plan view of the liquid container with no liquid stored.

FIG. 7 is a perspective view of the liquid outlet member 120 with the adapter 130 attached. FIG. 8 is a plan view of the liquid container 100 with no liquid stored.

As illustrated in FIG. 6, the adapter 130 is attached to the liquid outlet member 120 so as to cover it from above. As illustrated in FIG. 7, the upper surface of the adapter 130 is provided with two positioning projections 133 that project in the Z direction. The liquid outlet member 120 is provided with two positioning holes 122 penetrating in the Z direction, through which two respective positioning projections 133 are inserted. The adapter 130 is attached to the liquid outlet member 120 by inserting the two positioning projections 133 into the two respective positioning holes 122.

As illustrated in FIG. 7, in addition to the above configuration, the liquid outlet member 120 has the liquid outlet section 121 for delivering liquid to the liquid ejecting apparatus 10, and a weld section 124. The liquid outlet section 121 has two cylindrical sections 123. The liquid outlet section 121 is mounted on the one end 621 of the bag 110.

As illustrated in FIG. 6, the one end 621 of the bag 110 is welded to the weld section 124. As illustrated in FIG. 7, the two cylindrical sections 123 are disposed at ends of the liquid outlet section 121 in −Y direction. The weld section 124 is disposed between the end of the liquid outlet section 121 in +Y direction and the end of the liquid outlet section 121 in −Y direction. The two cylindrical sections 123 are located in the bag 110 with the bag 110 welded to the weld section 124, and the end of the liquid outlet section 121 in +Y direction is located outside the bag 110. The two cylindrical sections 123 each have a cylindrical shape with an axial direction parallel to the Y direction. The two cylindrical sections 123 are arranged in the X direction. The internal space of the liquid outlet section 121 is branched into two parts in the middle to form two internal spaces. The two internal spaces communicate with respective internal spaces of the two cylindrical sections 123.

The first liquid outlet pipe **140*a* and the second liquid outlet pipe 140*b* illustrated in FIG. 8 are respectively mounted on the two cylindrical sections 123 of the liquid outlet section 121. Each liquid outlet pipe 140 is a tube having flexibility, and has an inlet 141. Each liquid outlet pipe 140 allows the ink introduced from the inlet 141 to flow to the liquid outlet section 121. Specifically, the streams of ink introduced from the inlet 141 of the liquid outlet pipes 140 flow through the internal space of each cylindrical section 123, merge in the inside of the liquid outlet section 121, then flow to the end of the liquid outlet section 121 in +Y direction. The extension direction of the first liquid outlet pipe 140*a* and the second liquid outlet pipe 140*b* is −Y direction from the one end 621 to the other end 622**.

The first liquid outlet pipe **140*a* and the second liquid outlet pipe 140*b* are different from each other in length. Here, the length of a liquid outlet pipe 140 is the length from one end of the liquid outlet pipe 140 mounted on each cylindrical section 123 to the inlet 141. The first liquid outlet pipe 140*a* is longer than the second liquid outlet pipe 140*b*. In this embodiment, the length of the first liquid outlet pipe 140*a* is longer than half the length L from the one end 621 to the other end 622 of the bag 110. In addition, the length of the second liquid outlet pipe 140*b* is less than or equal to half the length L. Here, the length L refers to the Y direction length of the liquid storage portion where the bag 110 forming films are not welded under the condition that the first surface 111 and the second surface 112 of the bag 110 with no ink stored are arranged to be in close contact. As described in detail later, since the length of the first liquid outlet pipe 140*a* and the length of the second liquid outlet pipe 140*b* are different from each other, it is possible to reduce the amount of liquid that remains in the bag 110 without being consumed. In FIG. 8**, for the sake of understanding, central position CP that is the position of half the length L is indicated by a dashed line.

As illustrated in FIG. 5, the gas absorption unit 150 has a cylindrical space holding member 151, and a bag-shaped gas transmission film 152 that internally stores the space holding member 151. The space holding member 151 forms the internal space of the gas absorption unit 150. The gas transmission film 152 defines the inner side of the internal space of the gas absorption unit 150 and the outer side with the internal space decompressed to a pressure lower than the atmospheric pressure. Since the internal space of the gas absorption unit 150 is decompressed, the gas molecules, such as $N_2$, dissolved in the ink stored in the liquid container 100 transmits through the gas transmission film 152, and are trapped in the gas absorption unit 150.

As described above, the liquid stored in the liquid container 100 is ink that contains dye having an azo group. An azo group produces $N_2$ by a chemical reaction. Also, $N_2$ and $O_2$ in the atmosphere may transmit through the bag 110 forming films, and enter the liquid container 100. When a printing operation of discharging ink through the nozzles 33 is performed with gas molecules such as $N_2$ dissolved in a large amount in the ink, air bubbles may be generated in the ink and the print quality may be reduced. In this regard, in this embodiment, the gas absorption unit 150 is disposed in the bag 110, and the gas molecules dissolved in the ink are absorbed by the gas absorption unit 150, thus reduction in the print quality can be prevented.

Figure 9:
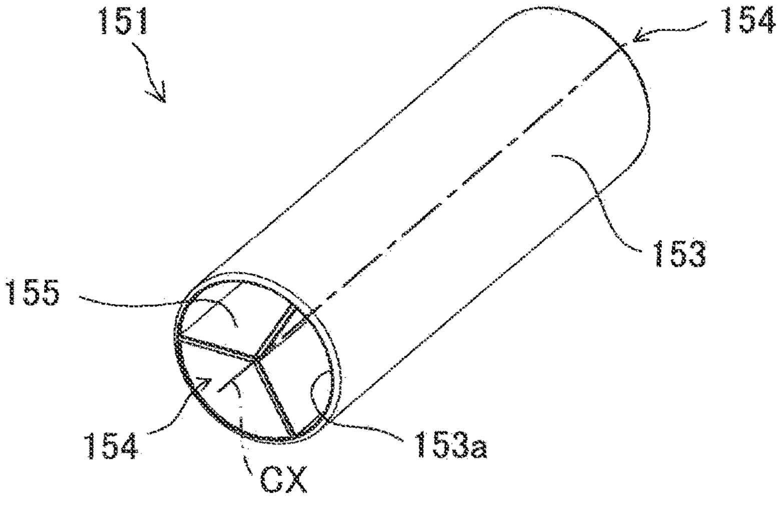
FIG. 9 is a perspective view of a space holding member.
Figure 10:
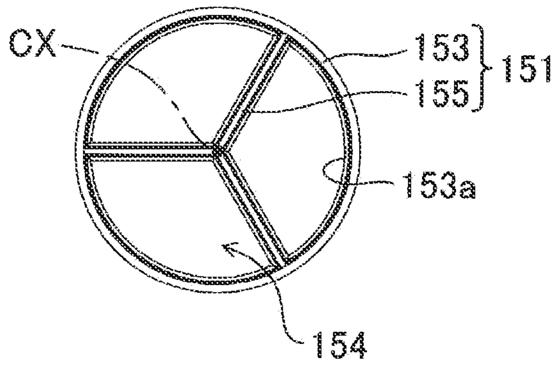
FIG. 10 is a front view of the space holding member.

FIG. 9 is a perspective view of the space holding member 151. FIG. 10 is a front view of the space holding member 151. The space holding member 151 illustrated in FIG. 9 has a degree of stiffness that can hold decompressed space of the gas absorption unit 150. In this embodiment, the space holding member 151 is composed of a resin that is molded by injection molding. Polypropylene and polyethylene may be used as the resin, and in this embodiment, polypropylene is used.

The space holding member 151 has a body section 153 that forms a decompressed space which is the internal space of the gas absorption unit 150, an opening 154 connecting the inside and the outside of the body section 153, and ribs 155 provided in an inner wall surface 153*a* of the body section 153. The length of the space holding member 151 in the central axis CX direction is approximately 90 mm. The outer diameter of the space holding member 151 is approximately 27 mm. The inner diameter of the space holding member 151 is approximately 25 mm. Since the space holding member 151 is cylindrical, concentration of stress due to an external pressure can be reduced, and the body section 153 can be protected from being deformed due to the pressure difference between the internal space of the gas absorption unit 150 and the outside. In addition, since the space holding member 151 is cylindrical, the bag 110 can be protected from being damaged due to pressing from the inside, as compared to the shape having a corner. The space holding member 151 is disposed with the central axis CX direction parallel to the first surface 111. Here, "parallel to the first surface 111" refers to a situation in which the angle formed by the first surface 111 and the central axis CX is in a range of −10 degrees or more and +10 degrees or less. Thus, the bag 110 can be protected from being damaged due to pressing of the end of the space holding member 151 in the central axis CX direction from the inside of the bag 110. In addition, since the size of the bag 110 in the Z direction is not expanded, the liquid container 100 can be appropriately stored in the case 61.

As illustrated in FIG. 10, the ribs 155 extend from the inner wall surface 153*a* to inward of the decompressed space. When seen in the central axis CX direction, the ribs 155 are coupled to a plurality of different points of the inner wall surface 153*a*. Specifically, the ribs 155 have a shape such that three flat plates extending in the central axis CX direction are joined at the central axis CX. The radial ends of the three flat plates forming the ribs 155 are coupled to the plurality of different points of the inner wall surface 153*a*. When seen in the central axis CX direction, the three flat plates forming the ribs 155 are disposed at regular angular intervals around the central axis CX. Since the gas absorption unit 150 has the ribs 155, the body section 153 can be protected from being deformed due to the pressure difference between the decompressed space and the outside. Thus, it is possible to prevent reduction in the deaeration capability of the gas absorption unit 150, caused by decrease of volume of the decompressed space due to deformation of the body section 153. Also, the positions of both ends of the ribs 155 in the central axis CX direction match the positions of both ends of the body section 153 in the central axis CX direction. Thus, it is possible to prevent the gas transmission film 152 from entering the decompressed space through the opening 154 due to the pressure difference between the decompressed space and the outside.

The gas absorption unit 150 illustrated in FIG. 5 is manufactured by welding, in the decompressed container, the opening of the gas transmission film 152 which stores the space holding member 151. Thus, the internal space of the gas absorption unit 150 becomes a decompressed space. The pressure in the decompressed container is a gauge pressure, and preferably −40 kPa or higher and −95 kPa of lower, and more preferably −50 kPa or higher and −85 kPa of lower. In this embodiment, the pressure in the decompressed container is −85 kPa or −70 kPa.

The lower the pressure of the decompressed space, the larger the amount of gas taken by the gas absorption unit 150 from the outside. On the other hand, there is a tendency that the lower the pressure of the decompressed space, the higher the manufacturing cost of the gas absorption unit 150. Therefore, it is preferable to determine the pressure of the decompressed space in consideration of the deaeration capability required for the gas absorption unit 150, and the manufacturing cost.

The gas transmission film 152 illustrated in FIG. 5 has a gas permeability, and prevents liquid from entering. The material for the gas transmission film 152 is preferably a thermoplastic resin having no reactivity with the ink in the bag 110, for example, polypropylene, polyethylene and polystyrene. Furthermore, the gas transmission film 152 is preferably a monolayer film. When a monolayer film and a laminated film which are composed of the same material are compared, in general, the monolayer film has a higher gas permeability than that of the laminated film. In this embodiment, a polyethylene monolayer film is used as the gas transmission film 152.

As illustrated in FIG. 5, the gas absorption unit 150 is movably disposed in the bag 110. As described above, as the ink in the bag 110 is consumed, the internal space of the bag 110 decreases, and the external shape of the bag 110 is deformed so that the first surface 111 and the second surface 112 approach each other. The space holding member 151 has a higher stiffness than that of the bag 110 forming films, thus as the ink is consumed, each of the first surface 111 and the second surface 112 is deformed along the external shape of the space holding member 151. Thus, around the space holding member 151, a space which is supported by the space holding member 151, and in which ink accumulates is likely to be formed. Here, the lengths of the first liquid outlet pipe 140*a* and the second liquid outlet pipe 140*b* are different from each other, thus the inlet 141 of the first liquid outlet pipe 140*a* or the second liquid outlet pipe 140*b* is present near the space holding member 151 regardless of the position of the space holding member 151 within the bag 110. Thus, the ink around the gas absorption unit 150 is introduced into a nearby inlet 141. Therefore, it is possible to prevent remaining ink resulting after the ink around the gas absorption unit 150 is not consumed and left.

The first liquid outlet pipe 140*a* is longer than half the length L of the bag 110. Thus, it is possible to reduce the occurrence of an occluded area due to consumption of the ink with the gas absorption unit 150 located near the other end 622. If the length of the first liquid outlet pipe 140*a* is substantially equal to the length of the second liquid outlet pipe 140*b*, and the gas absorption unit 150 is located near the other end 622, an occluded area may be formed around the gas absorption unit 150. Specifically, the occluded area is an area where a flow path of ink to the inlet 141 is blocked, the area being formed because the first surface 111 and the second surface 112 of the bag 110 are in close contact between the inlet 141 and the gas absorption unit 150 from one end to the other end of the bag 110 in the X direction. In this regard, according to this embodiment, even when the gas absorption unit 150 is located near the other end 622, the inlet 141 of the first liquid outlet pipe 140*a* is located near the gas absorption unit 150, thus formation of an occluded area can be prevented. Note that it is preferable that the length of the first liquid outlet pipe 140*a* be longer than ¾ the length L of the bag 110. This is because the possibility of formation of an occluded area can be further reduced.

The length of the second liquid outlet pipe 140*b* is less than or equal to half the length L of the bag 110. Thus, the possibility of formation of an occluded area in the vicinity of the one end 621 can be reduced.

According to the first embodiment described above, the lengths of the first liquid outlet pipe 140*a* and the second liquid outlet pipe 140*b* are different from each other. Thus, the inlet 141 of the first liquid outlet pipe 140*a* or the second liquid outlet pipe 140*b* is present near the gas absorption unit 150 regardless of the position of the gas absorption unit 150 within the bag 110. Therefore, the ink around the gas absorption unit 150 is discharged from a nearby liquid outlet pipe 140, thus, it is possible to prevent remaining ink resulting after the ink around the gas absorption unit 150 is not consumed and left.

In addition, the length of the first liquid outlet pipe 140*a* is longer than half the length L of the bag 110. Thus, when the gas absorption unit 150 is near the other end 622, the liquid around the gas absorption unit 150 can be discharged using the first liquid outlet pipe 140*a*. Thus, the liquid around the gas absorption unit 150 can be prevented from remaining without being consumed.

In addition, the length of the second liquid outlet pipe 140*b* is less than or equal to half the length L of the bag 110. Thus, the liquid in the vicinity of the one end 621 can be discharged using the second liquid outlet pipe 140*b*. Therefore, the liquid in the vicinity of the one end 621 can be prevented from remaining without being consumed.

The space holding member 151 has the body section 153 forming the internal space, and the opening 154. The gas transmission film 152 defines the inside of the internal space and the outside by storing the space holding member 151. Thus, the gas absorption unit 150 which traps the gas dissolved in the ink can be formed by storing the space holding member 151 in the gas transmission film 152.

Since the space holding member 151 is cylindrical, concentration of stress can be reduced, and the body section 153 can be protected from being deformed due to the pressure difference between the internal space of the gas absorption unit 150 and the outside. Since the space holding member 151 has the ribs 155, the body section 153 can be protected from being deformed due to the pressure difference between the internal space of the gas absorption unit 150 and the outside. The space holding member 151 is disposed with the axial direction parallel to the first surface 111 of the bag 110. Thus, the bag 110 can be protected from being damaged from the inside due to pressing of the axial end of the space holding member 151 to the bag 110 forming films from the inside.

B. Second Embodiment

Figure 11:
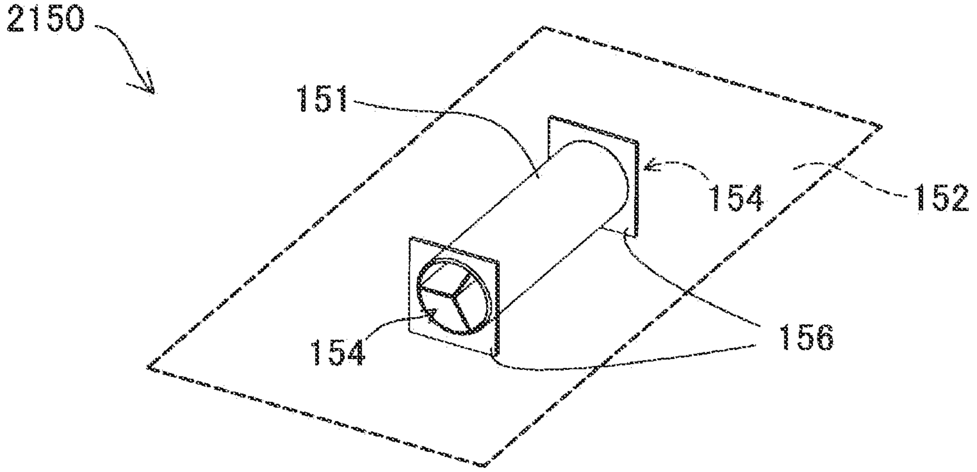
FIG. 11 is a schematic view illustrating a gas absorption unit according to a second embodiment.

FIG. 11 is a schematic view illustrating a gas absorption unit 2150 according to a second embodiment. The gas absorption unit 2150 according to the second embodiment differs from the gas absorption unit 150 according to the first embodiment in that sealing films 156 are provided. The same components as in the first embodiment are labeled with the same symbol, and a detailed description is omitted.

Each sealing film 156 is a film member having a gas permeability, and is welded to the opening 154. In this embodiment, for the sealing film 156, a film member is used, which is composed of the same material as that of the gas transmission film 152 and the space holding member 151. The sealing film 156 can be properly welded to the space holding member 151 by using the same material for the space holding member 151 and the sealing film 156. Specifically in this embodiment, the material for the space holding member 151 and the sealing film 156 is polypropylene. Note that as the material for the space holding member 151 and the sealing film 156, another resin such as polyethylene may be used.

As in the first embodiment, the gas absorption unit 2150 is manufactured in a decompressed container. Specifically, first, a sealing film 156 is welded to each opening 154 of the space holding member 151 in the decompressed container. Next, after the space holding member 151 with the sealing film 156 welded is inserted inwardly through the opening of the gas transmission film 152 in the decompressed container, the opening of the gas transmission film 152 is closed by welding. Thus, both internal spaces of the space holding member 151 and the gas transmission film 152, which are defined by the sealing film 156 are decompressed spaces. Thus, the gas absorption unit 2150 is manufactured.

According to the second embodiment described above, the decompressed space as the internal space of the space holding member 151, and the outer side are also defined by the sealing films 156 in addition to the gas transmission film 152. Thus, film members having a gas permeability are doubly provided between the decompressed space and the outer side. Thus, the rate of absorption of gas by the gas absorption unit 2150 can be made lower than that of the gas absorption unit 150 according to the first embodiment. Therefore, the period in which the deaeration capability of the gas absorption unit 2150 is exhibited can be increased, as compared to a configuration in which the sealing film 156 is not provided.

C. Third Embodiment

Figure 12:
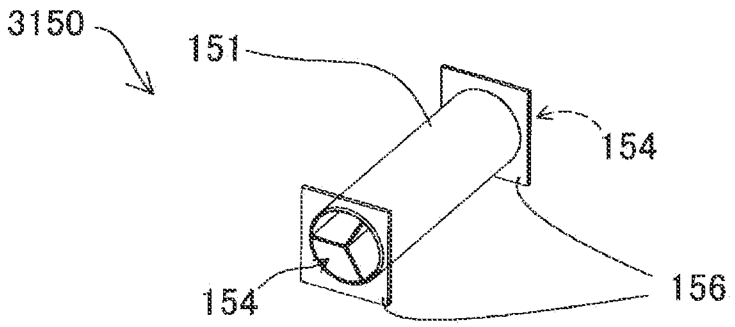
FIG. 12 is a schematic view illustrating a gas absorption unit according to a third embodiment.

FIG. 12 is a schematic view illustrating a gas absorption unit 3150 according to a third embodiment. The gas absorption unit 3150 differs from the gas absorption unit 150 according to the first embodiment in that the gas transmission film 152 is not provided, and the sealing films 156 are provided. The same components as in the above embodiment are labeled with the same symbol, and a detailed description is omitted.

In the gas absorption unit 3150, the inside of the decompressed space and the outside are defined by sealing the openings 154 of the space holding member 151 with the gas transmission film 152.

According to the third embodiment described above, the area of a film having a gas permeability defining the decompressed space and the outer side is reduced, as compared to the gas absorption unit 150 according to the first embodiment, thus the rate of absorption of gas by the gas absorption unit 3150 can be made lower than that of the gas absorption unit 150 according to the first embodiment. Therefore, the period in which the deaeration capability of the gas absorption unit 3150 is exhibited can be increased, as compared to the first embodiment. In addition, the size of a film member having a gas permeability used for the gas absorption unit 3150 can be made smaller than that of the gas absorption unit 150 according to the first embodiment, thus the manufacturing cost can be reduced.

D. Other Embodiments (D1) In the first embodiment, the length of the first liquid outlet pipe 140*a* is longer than half the length L of the bag

110, and the length of the second liquid outlet pipe 140*b* is less than or equal to half the length L of the bag 110. The length of each liquid outlet pipe 140 is not limited to this. The lengths of the first liquid outlet pipe 140*a* and the second liquid outlet pipe 140*b* are different from each other, thus the liquid around the gas absorption unit 150 is discharged from the first liquid outlet pipe 140*a* or the second liquid outlet pipe 140*b*. Therefore, the liquid around the gas absorption unit 150 can be prevented from remaining.

(D2) In the first embodiment, one gas absorption unit 150 is disposed in the liquid container 100. The number of gas absorption units 150 disposed in the liquid container 100 is not limited to one. The greater the amount of liquid stored in the liquid container 100, the greater amount of gas occurs. Thus, the number of gas absorption units 150 is preferably adjusted according to the capacity of the liquid container 100.

E. Other Aspects

The present disclosure is not limited to the foregoing embodiments and can be implemented with various configurations within a scope not departing from the spirit. For example, the technical features in the foregoing embodiments, corresponding to the technical features of the configurations described below may be replaced, or combined as appropriate to solve some or all of the problems described above or to achieve some or all of the effects of described above. Unless technical features are explained in the present specification as essential ones, they can be omitted as appropriate.

(1) According to a first aspect of the present disclosure, a liquid container is provided. The liquid container includes: a bag having flexibility configured to store liquid inside; a liquid outlet member mounted on one end of the bag and having a liquid outlet section to discharge the liquid to a liquid ejecting apparatus; a gas absorption unit movably disposed in the bag and having (i) a space holding member that forms an internal space of the gas absorption unit, and (ii) a gas transmission film that defines an inside of the internal space and an outside with the internal space decompressed to a pressure lower than an atmospheric pressure; and a plurality of liquid outlet pipes coupled to the liquid outlet section and disposed in the bag, the plurality of liquid outlet pipes having an inlet, which are configured to allow the liquid introduced from the inlet to flow to the liquid outlet section. Lengths of the plurality of liquid outlet pipes are different. According to this aspect, since the lengths of the plurality of liquid outlet pipes are different from each other, an inlet for one of the plurality of liquid outlet pipes is present near the gas absorption unit regardless of the position of the gas absorption unit within the bag. Therefore, the liquid around the gas absorption unit is discharged through a nearby liquid outlet pipe, thus it is possible to prevent remaining ink resulting after the ink around the gas absorption unit is not consumed and left.

(2) In the above-described aspect, the bag may have the other end opposed to the one end, an extension direction of the plurality of liquid outlet pipes may be a direction from the one end to the other end, and the plurality of liquid outlet pipes may include a first liquid outlet pipe and a second liquid outlet pipe, a length of the first liquid outlet pipe may be greater than half a length from the one end to the other end of the bag. According to this aspect, when the gas absorption unit is near the other end, the liquid around the gas absorption unit can be introduced using the first liquid outlet pipe. Therefore, the liquid around the other end of the bag can be prevented from remaining.

(3) In the above-described aspect, the length of the second liquid outlet pipe may be less than or equal to half the length from the one end to the other end of the bag. According to this aspect, the liquid around the one end of the bag can be prevented from remaining.

(4) In the above-described aspect, the space holding member may have a body section that forms the internal space, and an opening which connects an inside and an outside of the body section, and the gas transmission film may define the inside of the internal space and the outside by storing the space holding member. According to this aspect, the gas absorption unit can be formed, which draws in the gas dissolved in the liquid by storing the space holding member in the gas transmission film.

(5) In the above-described aspect, the gas absorption unit may further include a sealing film that has a gas permeability and seal the opening. According to this aspect, the period in which the deaeration capability of the gas absorption unit is exhibited can be increased by reducing the rate of absorption of the gas.

(6) In the above-described aspect, the space holding member may have a body section that forms the internal space, and an opening which connects an inside and an outside of the body section, and the gas transmission film may define the inside of the internal space and the outside by sealing the opening with the internal space decompressed. According to this aspect, the period in which the deaeration capability of the gas absorption unit is exhibited can be increased by reducing the rate of absorption of the gas.

(7) In the above-described aspect, the space holding member may have a body section that forms the internal space, and an opening which connects an inside and an outside of the body section, the space holding member being cylindrical. According to this aspect, concentration of stress can be reduced, and the body section can be protected from being deformed due to the pressure difference between the internal space of the gas absorption unit and the outside.

(8) In the above-described aspect, the space holding member may have a rib provided in an inner wall surface of the body section. According to this aspect, the body section can be protected from being deformed due to the pressure difference between the internal space of the gas absorption unit and the outside.

(9) In the above-described aspect, the bag may have a first surface, and a second surface opposed to the first surface, a liquid storage space may be formed by sealing a periphery of the first surface and the second surface which are overlapped, and the space holding member may be disposed with an axial direction parallel to the first surface. According to this aspect, the bag can be protected from being damaged from the inside due to pressing of the axial end of the space holding member to the bag forming films from the inside.

In addition to the above-described aspects, the present disclosure can be implemented as a form of a method for manufacturing a liquid container, and a liquid ejecting system which is a liquid ejecting apparatus including the liquid container.

What is claimed is:

1. A liquid container comprising:

a bag having flexibility configured to store liquid inside;

a liquid outlet member mounted on one end of the bag and having a liquid outlet section to discharge the liquid to a liquid ejecting apparatus;

a gas absorption unit movably disposed in the bag and having (i) a space holding member that forms an internal space of the gas absorption unit, and (ii) a gas transmission film that defines an inside of the internal space and an outside with the internal space decompressed to a pressure lower than an atmospheric pressure; and a plurality of liquid outlet pipes coupled to the liquid outlet section and disposed in the bag, the plurality of liquid outlet pipes having an inlet, which are configured to allow the liquid introduced from the inlet to flow to the liquid outlet section, wherein lengths of the plurality of liquid outlet pipes are different, the bag has the other end opposed to the one end, an extension direction of the plurality of liquid outlet pipes is a direction from the one end to the other end, and the inlet of one of the plurality of liquid outlet pipes and the inlet of another one of the plurality of liquid outlet pipes are located at different locations in the extension direction.

2. The liquid container according to claim 1, wherein the plurality of liquid outlet pipes include a first liquid outlet pipe and a second liquid outlet pipe, and a length of the first liquid outlet pipe is greater than half a length from the one end to the other end of the bag.

3. The liquid container according to claim 2, wherein a length of the second liquid outlet pipe is less than or equal to half the length from the one end to the other end of the bag.

4. The liquid container according to claim 1, wherein the space holding member has a body section that forms the internal space, and an opening which connects an inside and an outside of the body section, and the gas transmission film defines the inside of the internal space and the outside by storing the space holding member.

5. The liquid container according to claim 4, wherein the gas absorption unit further includes a sealing film that has a gas permeability and seals the opening.

6. The liquid container according to claim 1, wherein the space holding member has a body section that forms the internal space, and an opening which connects an inside and an outside of the body section, and the gas transmission film defines the inside of the internal space and the outside by sealing the opening with the internal space decompressed.

7. The liquid container according to claim 1, wherein the space holding member has a body section that forms the internal space, and an opening which connects an inside and an outside of the body section, the space holding member being cylindrical.

8. The liquid container according to claim 7, wherein the space holding member has a rib provided in an inner wall surface of the body section.

9. The liquid container according to claim 7, wherein the bag has a first surface, and a second surface opposed to the first surface, a liquid storage space is formed by sealing a periphery of the first surface and the second surface which are overlapped, and the space holding member is disposed with an axial direction parallel to the first surface.

* * * * *